United States Patent [19]
Yanagisawa

[11] Patent Number: 6,083,626
[45] Date of Patent: Jul. 4, 2000

[54] MAGNETIC STORAGE MEMBER COMPRISING A CARBON LAYER AND DIRECTLY OVERCOATED FLUOROLUBRICANT LAYER

[75] Inventor: Masahiro Yanagisawa, Tokyo, Japan

[73] Assignee: NEC Corporation, Tokyo, Japan

[21] Appl. No.: 08/979,849

[22] Filed: Nov. 26, 1997

Related U.S. Application Data

[63] Continuation of application No. 08/470,709, Jun. 6, 1995, Pat. No. 5,900,318, which is a continuation of application No. 08/266,114, Jun. 27, 1994, abandoned, which is a continuation of application No. 08/044,051, Apr. 8, 1993, abandoned.

[30] Foreign Application Priority Data

Apr. 8, 1992 [JP] Japan ...................... 4-86828

[51] Int. Cl.$^7$ .................................... G11B 5/725
[52] U.S. Cl. .................. 428/421; 428/422; 428/694 TF; 428/694 TP; 428/694 TC; 428/900; 428/408
[58] Field of Search ..................... 428/421, 422, 428/694 TF, 694 TP, 694 TC, 900, 408

[56] References Cited

U.S. PATENT DOCUMENTS

| | | | |
|---|---|---|---|
| 2,748,082 | 5/1956 | Zachar | 252/47.5 |
| 4,084,059 | 4/1978 | Katsushima et al. | 560/87 |
| 4,154,875 | 5/1979 | Yanagisawa et al. | 427/130 |
| 4,536,444 | 8/1985 | Sumiya et al. | 428/340 |
| 4,696,845 | 9/1987 | Yanagisawa | 428/64 |
| 4,726,990 | 2/1988 | Shimozawa et al. | 428/323 |
| 4,889,939 | 12/1989 | Caporiccio et al. | 549/13 |
| 5,091,249 | 2/1992 | Nishikawa et al. | 428/336 |
| 5,128,216 | 7/1992 | Ng | 428/695 |
| 5,137,784 | 8/1992 | Suzuki et al. | 428/408 |
| 5,188,747 | 2/1993 | Kai et al. | 252/54 |
| 5,252,400 | 10/1993 | Mizuno et al. | 428/421 |
| 5,374,480 | 12/1994 | Nishikawa et al. | 428/336 |
| 5,521,017 | 5/1996 | Yanagisawa et al. | 428/626 |

FOREIGN PATENT DOCUMENTS

| | | |
|---|---|---|
| 52-20804 | 2/1977 | Japan . |
| 52-49805 | 4/1977 | Japan . |

OTHER PUBLICATIONS

Pharmaceutical Bulletin, vol. 2, No. 2, 1954, pp. 163–173.

*Primary Examiner*—Stevan A. Resan
*Attorney, Agent, or Firm*—Sughrue, Mion, Zinn, Macpeak & Seas, PLLC

[57] ABSTRACT

The invention provides a magnetic storage member having a magnetic medium coated on a substrate, a protective film coated on the medium, and a lubricant coated on the protective film, the lubricant having a functional group with an inorganic character of 110 or more. The magnetic storage member is provided with the lubricant which can prevent adsorption to a magnetic head, is not removed by sliding with the head and rotation of the magnetic storage member, and has excellent wear resistance.

2 Claims, 1 Drawing Sheet

MAGNETIC STORAGE MEMBER COMPRISING A CARBON LAYER AND DIRECTLY OVERCOATED FLUOROLUBRICANT LAYER

This is a continuation of application Ser. No. 08/470,709 filed Jun. 6, 1995 now U.S. Pat. No. 5,900,318, which is a Continuation of application Ser. No. 08/266,114 filed Jun. 27, 1994 (now abandoned), which is a Continuation of application Ser. No. 08/044,051 filed Apr. 8, 1993 (now abandoned).

BACKGROUND OF THE INVENTION

1. Field of the Invention

This invention relates to an improved magnetic storage member for use in a magnetic storage unit such as a magnetic disk unit, a magnetic drum unit or the like.

2. Description of the Related Art

Generally, recording and reproducing systems for magnetic storage units having magnetic heads for recording and reproducing (hereinafter referred to as "head" for simplicity) and magnetic storage member are as follows. For instance, one of the systems relates to a contact-start-stop system (hereinafter referred to as "CSS" for simplicity). In the CSS system, at the start of operation, a head is brought into contact with the surface of a magnetic storage member and then the magnetic storage member is rotated at a given speed to thereby provide a spacing due to an air layer created between the head and the surface of the magnetic storage member, thereby enabling the recording and reproducing operations. In this system, at the end of operation, rotation of the magnetic storage member stops in a state where the head and the magnetic storage member are maintained in frictional contact with each other in the same manner as in the start of operation. Frictional power created between the head and the magnetic storage member, which are maintained in such frictional contact, causes the head and the magnetic storage member to wear out and, in the end, damages the head and a magnetic medium.

Furthermore, in the state of frictional contact as mentioned above, slight change in position of the head makes load added to the head ununiform, whereby the surfaces of the head and magnetic storage member are in some cases damaged. In addition, when the head and the storage member come in contact with each other for long time, the head and the magnetic storage member are adsorbed to each other and thus it is hard to separate them from each other.

In order to prevent the magnetic storage member from being destroyed and adsorbed by contact and sliding with the head, the surface of the magnetic storage member (i.e. a protective film) has been coated with a lubricant, such as perfluoropolyether or the like, as referred to in Japanese Unexamined Patent Publication No. 52-49805. The publication describes perfluoropolyether having a functional group such as —COOH, —CH$_2$OH, —COOCH$_3$ or a group of the following formula.

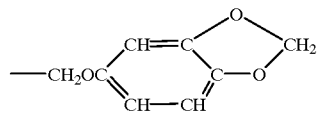

The above-mentioned functional groups have inorganic characters of 150, 100, 60 and 15, respectively.

However, the lubricants having the above-mentioned functional groups have weak adsorbability to the protective film and are removed from the surface of the protective film by repetition of the sliding with the head or a number of CSS's, or by the centrifugal force caused due to the rotation of the magnetic storage member such as the magnetic disk, and thus it is impossible to prevent the magnetic storage member from being damaged. In addition, the lubricant thus removed is thickly localized on and adsorbed to the contact sliding surface between the magnetic storage member and the head and thus it is hard to separate the storage member and the head from each other.

SUMMARY OF THE INVENTION

It is an object of this invention to provide a magnetic storage member provided with a lubricant which can prevent adsorption to a magnetic head, be not removed by sliding with the head, be not removed by rotation of the magnetic storage member and has wear resistance.

The invention provides a magnetic storage member comprising a substrate, a magnetic medium laid on the substrate, a protective film laid on the magnetic medium, and a lubricant laid on the protective film and having a functional group with an inorganic character of 110 or more.

In a preferred embodiment, the lubricant has the functional group of the following formula:

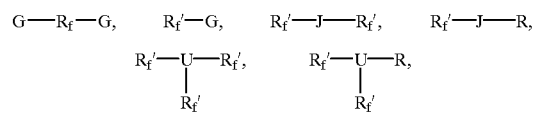

or

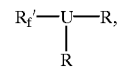

or mixtures thereof, wherein G represents —AsO$_3$H$_2$, J represents >AsO$_2$H, >NOH, —SO$_2$NHCO—, —NHSO$_2$NH—, —CONHCONHCO—, —CONHCONH—, —SO$_2$NH—, —CSNH—, —NHCONH—, —CONH—, —COOCO— or lactone ring and U represents >NNH—.

The lactone ring has the following formula:

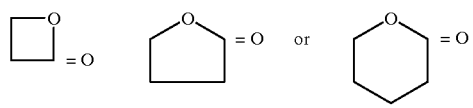

The above-mentioned functional groups have inorganic characters of 110 or more, indicating strength of bond of the functional group to the protective film. Thus, ability of the functional group which is to be held on the surface of the magnetic storage member is more superior than that of functional groups used in the prior art. The inorganic character is an index indicating affinity of a functional group as can be seen from Pharmaceutical Bulletin, Vol. 2, No. 2, p.163 (1954). That is, the boiling point of derivatives having any functional group is relatively expressed on the basis of that of an alcohol derivative of hydrocarbon to be in terms of 100. The above-mentioned functional groups have inorganic characters of characters 300, 300, 220, 260, 250, 250, 240, 240, 230, 220, 200, 110, 120 and 210, respectively.

In the above formula, R$_f$ represents —CF$_2$(COF$_2$)$_p$(OC$_2$F$_4$)$_q$OCF$_2$—, R$_f'$ represents F(CF(CF$_3$)CF$_2$O)$_p$(OCF$_2$)$_q$ $OCF_2$—, $F(CF(CF_3)CF_2O)_rCF_2$—, $F(C_3F_6O)_rC_2F_4$—, $C_nF_{2n+1}$—, $C_nF_{2n+1}C_mH_{2m}$—, $HC_kH_{2k}C_nF_{2n}$—, $HC_kH_{2k}C_nF_{2n}C_mH_{2m}$— or $C_nH_{2n+1}$—, and p, q, r and m are an integer of 1 or more, n is an integer of 3 or more and k is zero or an integer of 1 or more.

The substrate is made of, for instance, an alloy such as an aluminum alloy, titanium alloy, stainless steel or the like; plastic such as polyester, polyimide, polyamide-imide, polyether sulfone, polysulfone, aromatic polyether, epoxy resin, urea resin, melamine resin, polycarbonate, diallyl phthalate resin, acrylic resin, phenolic resin, polyphenylene sulfide, polyphenylene ether, polyacetal resin, polybutylene terephthalate, bismaleimide triazine resin, polyoxybenzylene resin, polyaminobismaleimide resin, polyphenylene oxide, polyphenylene sulfide or the likes ceramics such as glass, silicon, germanium, alumina, silica, diamond or the like; an aluminum alloy coated with anodized aluminum; an Ni—P plating film; FeNi; or a metal such as Cr, Mo, W or the like.

The magnetic medium coated on the above-mentioned substrate is made of a magnetic material, for instance, an oxide such as $Fe_3O_4$, $\gamma$-$Fe_2O_3$, barium ferrite, $CrO_2$ or the like; a nitride such as $Fe_3N_4$ or the like; carbide such as $Fe_5C_2$ or a the like; Co or a Co-containing metal such as CoNi, CoNiP, CoMnP, CoMnNiP, CoRe, CoPt, CoNiPt, CoCr, CoCrTa, CoNiRe, CoMnReP, CoFeCr, CoV, CoRu, CoOs, CoPtCr, CoPtV, CoRh, CoCrRh, CoNiMo, CoNiCr, CoNiW, CoSm or the like; Fe-containing metal such as FeNd, FeMg, FeNd, FeAg, FePd, FeTb or the like; or Mn-containing metal such as MnAl, MnCuAl or the like. In addition, the magnetic medium may include resin in which finely-divided particles of the above-mentioned magnetic materials are incorporated and dispersed.

The above-mentioned protective film is made of, for instance, a silicon compound such as $SiO_2$, $Si_3N_4$, SiC, silicic polymer or the like; a metal oxide such as $Al_2O_3$, CoO, $Co_3O_4$, $Co_2O_3$, $\alpha$-$Fe_2O_3$, $Cr_2O_3$, $CrO_3$, $TiO_2$, $ZrO_2$, ZnO, PbO, NiO, $MoO_2$, $SnO_2$ or the like; a metal nitride such as TiN, ZrN, CrN, TaN, BN or the like; a metal sulfide such as $MoS_2$, $WS_2$, $TaS_2$ or the like; a metal carbide such as TiC, ZrC, CrC, TaC or the like; a metal fluoride such as graphite fluoride or the like; a metal such as W, Cr, Ir, NiB, NiP, FeCr, NiCr, Sn, Pb, Zn, Tl, Au, Ag, Cu, Ga, Ru, Rh, Mn, Mo, Os or Ta or alloys thereof; a semiconductor such as Si, Ge, B, C (diamond, amorphous or diamond-like carbon or mixtures thereof or graphite-like carbon or mixtures thereof) or the like; or plastic such as polytetrafluoroethylene, phenolic resin, polyimide or the like.

The seven functional groups included in the abovementioned lubricant are strongly adsorbed on the surface of the protective film and thus those groups are not easily removed by sliding between the head and the magnetic storage member.

DETAILED DESCRIPTION OF THE PREFERRED EMBODIMENTS

Figure 1:
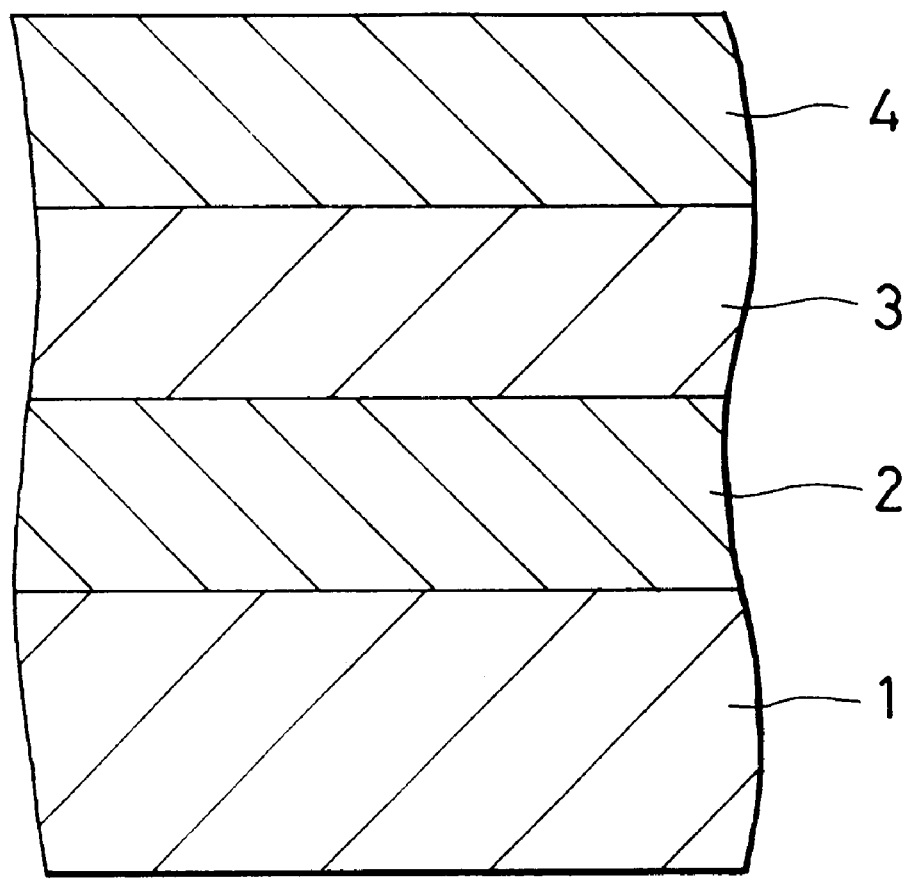
FIG. 1 is a partially and schematically cross-sectional view of a magnetic storage member of this invention.

Preferred embodiments of this invention will hereinafter be described in more detail with reference to FIG. 1. The effects practically achieved by this invention will also be discussed in detail in comparison with Comparative Examples. Of course, the invention is not limited to the examples chosen and it is possible to envisage other variations thereon without departing from the scope of the invention.

EXAMPLE 1

An aluminum alloy base was coated with a nickel-phosphorus plating film and was mirror-finished with surface roughness of 0.02 micrometers to form a substrate 1. A cobalt-nickel-phosphorus alloy was plated on the substrate 1 to form a magnetic medium 2 having a thickness of 0.05 micrometers. Then, polysilicic acid (silicic polymer) as shown in Japanese Unexamined Patent Publication No. 52-20804 (which corresponds to U.S. Pat. No. 4,154,875), the disclosure of which is hereby incorporated by reference herein, was applied onto the magnetic medium 2 by a spin coating method to cover the medium with a film having a thickness of 50 nanometers and then was calcined at 250° C. to form a protective film 3. Thereafter, a Freon (trade name of fluorohydrocarbon manufactured by Du Pont company, for instance, trichlorofluoromethane, dichlorodifluoromethane, chlorotrifluoromethane, chlorodifluoromethane, etc.) solution of a lubricant having the following structure was applied onto the protective film 3 by the spin coating method to form a lubricating film 4 having a thickness of 2 nanometers, and thus to make magnetic disks.

Lubricant A: $GCF_2(OCF_2)_{13}(OC_2F_4)_8OCF_2G$ wherein G represents —$AsO_3H_2$.

Lubricant B: $F(C_3F_6O)_{13}C_2F_4G$ wherein G is as defined in Lubricant A.

Lubricant C: $F(CF(CF_3)CF_2O)_{15}CF_2G$ wherein G is as defined in Lubricant A.

Lubricant D: $F(CF(CF_3)CF_2O)_9CF_2JCF_2(OCF_2(CF_3)CF)_9F$ wherein J represents >$AsO_2H$, >NOH, —$SO_2NHCH_2$—, —$NHSO_2NH$—, —CONHCONHCO—, —CONHCONH—, —$SO_2NH$—, —CSNH—, —NHCONH—, —CONH—, —COOCO—, lactone ring.

Lubricant E: $F(C_3F_6O)_{10}C_2F_4JF_4C_2(OF_6C_3)_{10}F$ wherein J is as defined in Lubricant D.

Lubricant F: $C_9F_{19}$-G wherein G is as defined in Lubricant A.

Lubricant G: $C_9F_{19}$-J-$C_9F_{19}$ wherein J is as defined in Lubricant D.

Lubricant H: $C_9F_{19}C_2H_4$-G wherein G is as defined in Lubricant A.

Lubricant I: $C_9F_{19}C_2H_4$-J-$C_2H_4C_9F_{19}$ wherein J is as defined in Lubricant D.

Lubricant J: $HC_{10}F_{20}$-G wherein G is as defined in Lubricant A.

Lubricant K: $HC_{10}F_{20}$-J-$C_{10}F_{20}H$ wherein J is as defined in Lubricant D.

Lubricant L: $HCH_2C_8F_{16}C_2H_4$-G wherein G is as defined in Lubricant A.

Lubricant M: $[F(C_3F_6O)_5C_2F_4]_2$>NNH—$C_2F_4(OC_3F_6)_5F$

Lubricant N: $[F(CF(CF_3)CF_2O)_rCF_2$—$]_2$>NNH—$CF_2(OCF_2CF(CF_3))_rF$

Lubricant O: $[C_9F_{19}C_2H_4]_2$>NNH—$C_2H_4C_9F_{19}$

Lubricant P: $[HCH_2C_8F_{16}C_2H_4]_2$>NNH—$C_2H_4C_8F_{16}CH_3$

Lubricant Q: $F(CF(CF_3)CF_2O)_9CF_2JC_{17}H_{35}$ wherein J is as defined in Lubricant D.

Lubricant R: $F(C_3F_6O)_{10}C_2F_4JC_8H_{17}$ wherein J is as defined in Lubricant D.

Lubricant S: $C_9F_{19}$-J-$C_{17}H_{35}$ wherein J is as defined in Lubricant D.

Lubricant T: $HC_{10}F_{20}$-J-$C_{17}H_{35}$ wherein J is as defined in Lubricant D.

Lubricant U: $[F(C_3F_6O)_5C_2F_4]_2\text{>NNH—}C_8H_{17}$

Lubricant V: $[F(CF(CF_3)CF_2O)_rCF_2\text{—}]_2\text{>NNH—}C_8H_{17}$

Lubricant W: 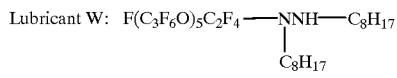

Lubricant X: 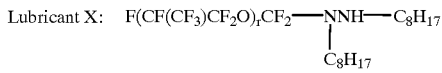

The CSS test was done 100,000 times for each magnetic disk thus obtained to evaluate wear properties thereof, with results that the initial friction coefficient of 0.1 did not change and no scratch was observed on surfaces of the heads and the magnetic disks. After the CSS test, the heads and the magnetic disks were left to stand for 70 hours and then the adsorbability acting therebetween was measured, with results that the measured values were the same as those before the shelf test. In addition, in order to examine change in the film thickness of the lubricant 4, a test was carried out under 1,000 rpm at a temperature of 60° C., with results that reduction in the film thickness was not entirely observed after two months.

EXAMPLE 2

The same procedures as in Example 1 were repeated to fabricate magnetic disks, except that a carbon film is coated on the magnetic medium 2 by a sputtering process to form the protective film 3.

The CSS test was done 100,000 times for each magnetic disk thus fabricated to evaluate wear properties thereof, with results that the initial friction coefficient of 0.2 did not almost change and no scratch was observed on surfaces of the heads and the magnetic disks. After the CSS test, the heads and the magnetic disks were left to stand for 70 hours and then the adsorbability acting therebetween was measured, with results that the measured values slightly increased by about 1.2 times those before the shelf test. In addition, the test was carried out under 1,000 rpm at a temperature of 60° C. in the same manner as in Example 1, with results that reduction in the film thickness of the lubricant 4 was not entirely observed after two months.

COMPARATIVE EXAMPLE 1

The same procedures as in Example 1 were repreated to fabricate a magnetic disk, except that perfluoropolyether having inorganic character of zero and having the following structure: $F(C_2F_4O)_5(CF_2O)_{15}CF_3$ was used as a lubricant 4 (1 nm thickness).

The CSS test was done 20,000 times for the magnetic disk thus fabricated to evaluate wear properties thereof, with results that the friction coefficient increased by about 7 times that of the initial friction coefficient and scratches resulted on the surfaces of the head and the magnetic disk, the scratches reaching the magnetic medium. After the CSS test, the head and the magnetic disk were left to stand for 70 hours and then the adsorbability acting therebetween was measured, with results that the measured value increased by about 10 times that before the shelf test. In addition, in the same manner as in Example 1, the test was carried out under 1,000 rpm at a temperature of, 60° C., with results that the film thickness of the lubricant decreased to zero after two months.

COMPARATIVE EXAMPLE 2

The same procedures were repeated to fabricate a magnetic disk, except that perfluoropolyether having inorganic character of 100 and having the following structure: $GCF_2(OCF_2)_{13}(OC_2F_4)_8OCF_2G$ wherein G represents $-CH_2OH$, was used as a lubricant 4 (1 nm thickness).

The CSS test was done 20,000 times for the magnetic disk thus fabricated to evaluate wear properties thereof, with results that the friction coefficient increased by about 10 times that of the initial friction coefficient and scratches resulted on the surfaces of the head and the magnetic disk, the scratches reaching the magnetic medium. After the CSS test, the magnetic disk was left to stand for 20 days under an atmosphere of a temperature of 40° C. and relative humidity of 80% and then the friction coefficient was measured, with results that the measured value increased by about 15 times that before the test. In addition, in the same manner as in Example 1, the test was carried out under 1,000 rpm at a temperature of 60° C., with results that the film thickness of the lubricant decreased to about one third relative to the initial film thickness after two months.

As discussed above in detail, the magnetic storage member according to this invention has low friction coefficient relative to sliding with the head, very slight change due to the sliding and excellent wear resistance. Furthermore, adsorbability acting between the magnetic storage member and the head does not occur even when the magnetic storage member is in static contact with the head over the period of long time and thus it is possible to remarkably improve in reliability of the conventional magnetic storages members shown in the comparative examples.

While this invention has been described in connection with certain preferred embodiments, it is to be understood that the subject matter encompassed by way of this invention is not to be limited to those specific embodiments. On the contrary, it is intended for the subjected matter of the invention to include all alternatives, modifications and equivalents as can be included within the spirit and scope of the following claims.

What is claimed is:

1. A magnetic storage member comprising a substrate having an aluminum alloy base and a nickel-phosphorus film coated on said base, a cobalt-nickel-phosphorus alloy film coated on said substrate, a carbon film coated on said cobalt-nickel-phosphorus alloy film and a lubricant coated without an intervening layer, directly on said carbon film, said lubricant being a member selected from the group consisting of:

$GCF_2(OCF_2)_{13}(OC_2F_4)_8OCF_2G$, $F(C_3F_6O)_{13}C_2F_4G$, $F(CF(CF_3)CF_2O)_{15}CF_2G$, $F(CF(CF_3)CF_2O)_9CF_2JCF_2(OCF_2(CF_3)CF)_9F$, $F(C_3F_6O)_{10}C_2F_4JF_4C_2(OF_6C_3)_{10}F$, $C_9F_{19}\text{-}G$, $C_9F_{19}C_2H_4\text{-}G$, $C_9F_{19}C_2H_4\text{-}J\text{-}C_2H_4C_9F_{19}$, $HC_{10}F_{20}\text{-}G$, $HC_{10}F_{20}\text{-}J\text{-}C_{10}F_{20}H$, $HCH_2C_8F_{16}C_2H_4\text{-}G$, $\{F(C_3F_6O)_5C_2F_4\}_2\text{>NNH—}C_2F_4(OC_3F_6)_5F$, $\{F(CF(CF_3)CF_2O)_rCF_2\}_2\text{>NNH—}CF_2(OCF_2CF(CF_3))_rF$, $\{C_9F_{19}C_2H_4\}_2\text{>NNH—}C_2H_4C_9F_{19}$, $\{HCH_2C_8F_{16}C_2H_4\}_2\text{>NNH—}C_2H_4C_8F_{16}CH_3$, $F(CF(CF_3)CF_2O)_9CF_2JC_{17}H_{35}$, $F(C_3F_6O)_{10}C_2F_4JC_6H_{17}$, $\{F(CF(C_3)CF_2O)_rCF_2\text{—}\}_2\text{>NNH—}C_8H_{17}\}$ $\{F(C_3F_6O)_5C_2F_4\}_2\text{>NNH—}C_8H_{17}$, $\{F(CF_3)CF_2O)CF_2\text{—}\}_2\text{>NNH—}C_8H_{17}$,

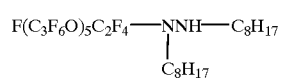
and
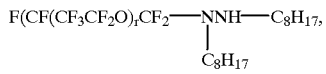
wherein G represents —AsO$_3$H$_2$, and J represents >AsO$_2$H, >NOH, —SO$_2$NHCH$_2$—, —CONHCONHCO—, —CONHCONH—, —CSNH—, or a lactone ring, and r is an integer of 1 or more.
2. The magnetic storage member as defined in claim 1, wherein said carbon film is formed by a sputtering process to form a protective film.
* * * * *

UNITED STATES PATENT AND TRADEMARK OFFICE
CERTIFICATE OF CORRECTION

PATENT NO.: 6,083,626
DATED: July 4, 2000
INVENTOR(S): Masahiro YANAGISAWA

It is certified that error(s) appears in the above-identified patent and that said Letters Patent is hereby corrected as shown below:

Column 6, line 64, delete "$JC_6$" insert --$JC_8$--.

Signed and Sealed this

Twenty-fourth Day of April, 2001

Attest:

NICHOLAS P. GODICI

*Attesting Officer*    *Acting Director of the United States Patent and Trademark Office*